US012586021B2

(12) United States Patent
Liu et al.

(10) Patent No.: US 12,586,021 B2
(45) Date of Patent: Mar. 24, 2026

(54) METHOD AND APPARATUS FOR PREDICTING RISK, ELECTRONIC DEVICE, COMPUTER READABLE STORAGE MEDIUM

(71) Applicant: Beijing Baidu Netcom Science Technology Co., Ltd., Beijing (CN)

(72) Inventors: Mengyue Liu, Beijing (CN); Haibin Zhang, Beijing (CN); Penghao Zhao, Beijing (CN); Shupeng Li, Beijing (CN); En Shi, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 371 days.

(21) Appl. No.: 18/169,727

(22) Filed: Feb. 15, 2023

(65) Prior Publication Data

US 2023/0196245 A1     Jun. 22, 2023

(30) Foreign Application Priority Data

Apr. 8, 2022     (CN) .......................... 202210369111.4

(51) Int. Cl.
G06Q 10/00          (2023.01)
G06N 7/01          (2023.01)
G06Q 10/0635          (2023.01)

(52) U.S. Cl.
CPC ........... G06Q 10/0635 (2013.01); G06N 7/01 (2023.01)

(58) Field of Classification Search
None
See application file for complete search history.

(56) References Cited

U.S. PATENT DOCUMENTS 6,662,141 B2 * 12/2003 Kaub ................... G08G 1/0104
                                                             702/181
7,526,446 B2 * 4/2009 Aguais ................... G06Q 40/03
                                                             705/37
(Continued)

FOREIGN PATENT DOCUMENTS

CN          110717824 A          1/2020
CN          111784488 A          10/2020
(Continued)

OTHER PUBLICATIONS

Pletnev, Aleksandr, Rodrigo Rivera-Castro, and Evgeny Burnaev. "Graph neural networks for model recommendation using time series data." 2020 19th IEEE International Conference on Machine Learning and Applications (ICMLA). IEEE, 2020. (Year: 2020).*
(Continued)

*Primary Examiner* — Gurkanwaljit Singh
(74) *Attorney, Agent, or Firm* — Seed Intellectual Property Law Group LLP

(57)          ABSTRACT

A method and apparatus for predicting a risk are provided. The method may include: determining an inherent risk probability of a to-be-tested object; building a relationship graph between the to-be-tested object and different associated objects; determining a primary conduction probability between any two directly associated objects in the relationship graph; determining, based on the primary conduction probability between any two directly associated objects in the relationship graph and the relationship graph, a multi-level conduction probability of the to-be-tested object; and determining a target risk probability of the to-be-tested object, based on the inherent risk probability and the multi-level conduction probability of the to-be-tested object.

20 Claims, 3 Drawing Sheets

(56) References Cited

U.S. PATENT DOCUMENTS

| | | | | |
|---|---|---|---|---|
| 8,301,537 | B1 * | 10/2012 | Rachev | G06Q 40/06 |
| | | | | 705/37 |
| 10,275,402 | B2 * | 4/2019 | Guerriero | F17D 5/06 |
| 2002/0082806 | A1 * | 6/2002 | Kaub | G08G 1/164 |
| | | | | 702/182 |
| 2003/0135450 | A1 * | 7/2003 | Aguais | G06Q 40/00 |
| | | | | 705/38 |
| 2004/0153330 | A1 * | 8/2004 | Miller | G06Q 40/03 |
| | | | | 705/36 R |
| 2009/0216910 | A1 * | 8/2009 | Duchesneau | F28D 15/06 |
| | | | | 709/250 |
| 2011/0295722 | A1 * | 12/2011 | Reisman | G06Q 30/0641 |
| | | | | 705/26.1 |
| 2014/0200953 | A1 * | 7/2014 | Mun | G06Q 10/04 |
| | | | | 705/7.28 |
| 2015/0088783 | A1 * | 3/2015 | Mun | G06Q 40/02 |
| | | | | 705/36 R |
| 2020/0202428 | A1 | 6/2020 | Song et al. | |
| 2020/0349647 | A1 * | 11/2020 | Crabtree | G06F 16/951 |
| 2021/0073915 | A1 * | 3/2021 | Crabtree | G06Q 30/0611 |
| 2022/0036302 | A1 * | 2/2022 | Cella | G06N 20/00 |
| 2022/0058745 | A1 * | 2/2022 | Crabtree | G06N 20/00 |
| 2022/0214679 | A1 * | 7/2022 | Pariyani | G06Q 10/0635 |
| 2024/0104401 | A1 * | 3/2024 | Dembo | G06Q 10/0635 |

FOREIGN PATENT DOCUMENTS

| | | | |
|---|---|---|---|
| CN | 112364182 | A | 2/2021 |
| CN | 113516553 | A | 10/2021 |
| CN | 114048330 | A | 2/2022 |
| JP | 2017-174405 | A | 9/2017 |

OTHER PUBLICATIONS

Ramsahai, Roland R. "Connecting actuarial judgment to probabilistic learning techniques with graph theory." arXiv preprint arXiv: 2007.15475 (2020). (Year: 2020).*

Wiesweg, Florian, Andreas Vogelsang, and Daniel Mendez. "Data-driven risk management for requirements engineering: An automated approach based on Bayesian networks." 2020 IEEE 28th International Requirements Engineering Conference (RE). IEEE, 2020. (Year: 2020).*

Huang et al., "Application of knowledge graph in banking risk management," Information Technology and Standardization, 2020, 6 pages.

Jiang et al., "Software project risk evaluation method based on object-oriented Bayesian network," Systems Engineering and Electronics, vol. 27, No. 2, Feb. 2005, 4 pages.

Tanbo et al., "Research on Customer Relationship and Risk Early Warning Based on Big Data," Tsinghua Financial Review, Aug. 2017, 9 pages.

* cited by examiner

100

300

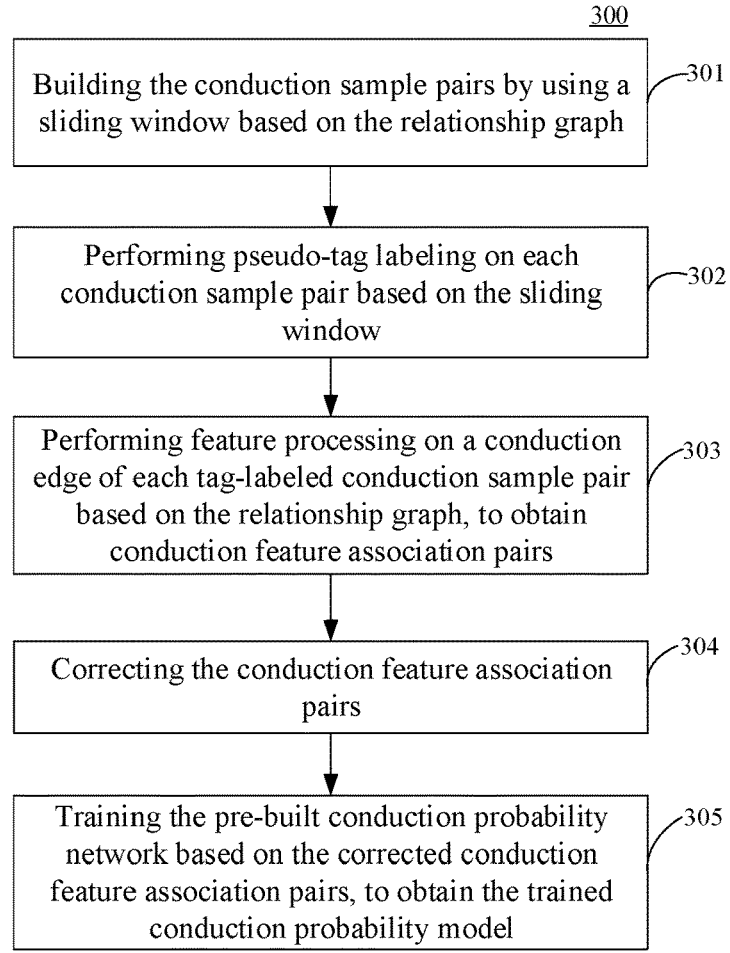

Building the conduction sample pairs by using a sliding window based on the relationship graph ⌐301

Performing pseudo-tag labeling on each conduction sample pair based on the sliding window ⌐302

Performing feature processing on a conduction edge of each tag-labeled conduction sample pair based on the relationship graph, to obtain conduction feature association pairs ⌐303

Correcting the conduction feature association pairs ⌐304

Training the pre-built conduction probability network based on the corrected conduction feature association pairs, to obtain the trained conduction probability model ⌐305

Fig. 3

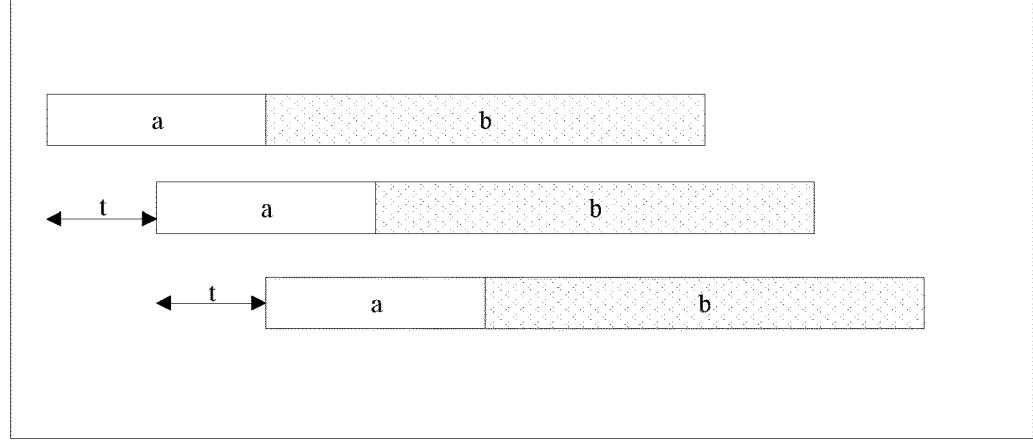

Fig. 4

METHOD AND APPARATUS FOR PREDICTING RISK, ELECTRONIC DEVICE, COMPUTER READABLE STORAGE MEDIUM

CROSS-REFERENCE TO RELATED APPLICATIONS

The present application claims the priority of Chinese Patent Application No. 202210369111.4, titled "METHOD AND APPARATUS FOR PREDICTING RISK, ELECTRONIC DEVICE, COMPUTER READABLE STORAGE MEDIUM", filed on Apr. 8, 2022, the content of which is incorporated herein by reference in its entirety.

TECHNICAL FIELD

The present disclosure relates to the field of computer technology, in particular to the technical fields of knowledge graphs and machine learning, and more particularly, to a method for predicting a risk, an electronic device, and a computer readable storage medium.

BACKGROUND

At present, the financial industry has a well-built model for enterprise risk prediction.

SUMMARY

The present disclosure provides a method and apparatus for predicting a risk, an electronic device, and a computer readable storage medium.

According to a first aspect, the present disclosure provides a method for predicting a risk. The method includes: determining an inherent risk probability of a to-be-tested object; building a relationship graph between the to-be-tested object and different associated objects; determining a primary conduction probability between any two directly associated objects in the relationship graph; determining, based on the primary conduction probability between any two directly associated objects in the relationship graph and the relationship graph, a multi-level conduction probability of the to-be-tested object; and determining a target risk probability of the to-be-tested object, based on the inherent risk probability and the multi-level conduction probability of the to-be-tested object.

According to a second aspect, the present disclosure provides an electronic device, including: at least one processor; and a memory communicatively connected to the at least one processor; where the memory stores instructions executable by the at least one processor, and the instructions, when executed by the at least one processor, cause the at least one processor to perform the method described in any of implementations of the first aspect.

According to a third aspect, the present disclosure provides a non-transitory computer readable storage medium storing computer instructions, where, the computer instructions are used to cause the computer to perform the method described in any of implementations of the first aspect.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

The accompanying drawings are used for better understanding of the present solution, and do not constitute a limitation to the present disclosure. In which:

FIG. 3 is a flowchart of an embodiment of a method for training a conduction probability model according to the present disclosure.

FIG. 4 is a schematic structural diagram of building conduction sample pairs using a sliding window in an embodiment of the present disclosure.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as an example. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

In the related art, there is still no good model for conductive risk prediction. On one hand, an association relationship between any two enterprises is complex, and an enterprise is often associated with a plurality of enterprises; on the other hand, the association relationship between any two enterprise may change over time, and risk conduction has a certain lag, which brings challenges to build a model.

Currently available enterprise risk conduction models mainly predict one stage of conduction, however, in real scenarios, on one hand, there is often an associated relationship between two enterprises, and there may be inter-level conduction problems. On the other hand, enterprise risk consists of two parts: an inherent risk and a conduction risk, but these two parts cannot be well separated. Therefore, when labelling tags for conduction edges, errors often occur.

Figure 1:
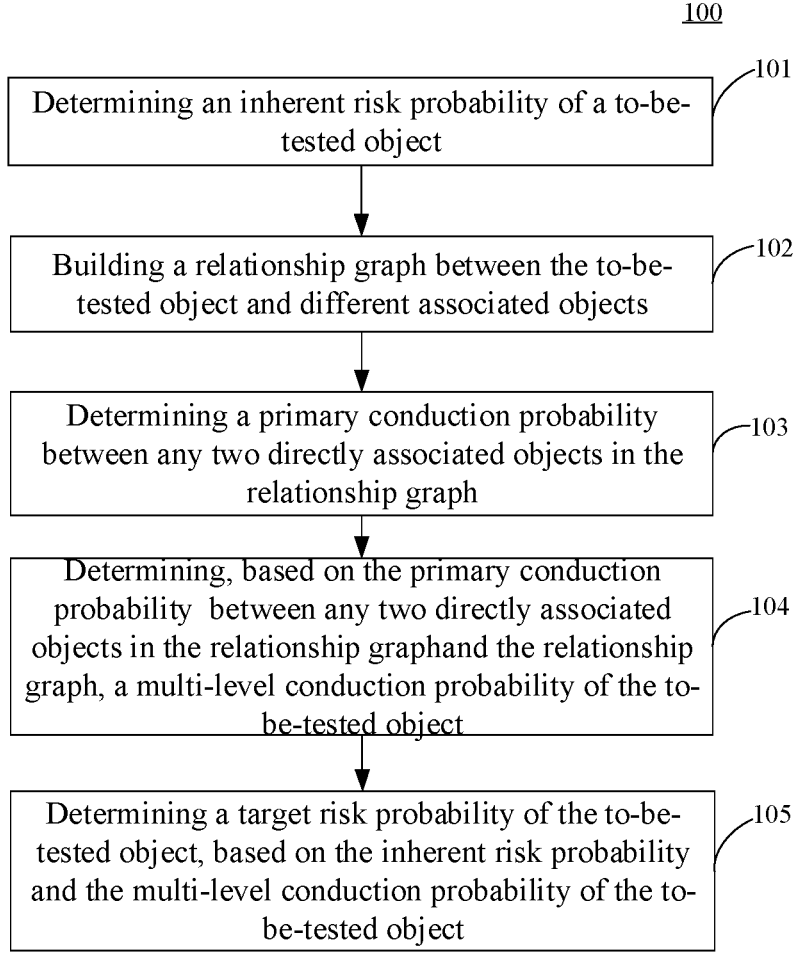
FIG. 1 is a flowchart of an embodiment of a method for predicting a risk according to the present disclosure.

Existing enterprises are complexly associated with each other, and it is difficult to separate an inherent risk of an enterprise from conduction risk, in order to solve the above-mentioned problem, the present disclosure provides a method for predicting a risk, to improve an accuracy of predicting enterprise risks through technical means. FIG. 1 shows a flow 100 of an embodiment of a method for predicting a risk according to the present disclosure. The method for predicting a risk includes the following steps.

Step 101 includes determining an inherent risk probability of a to-be-tested object.

In the present embodiment, the inherent risk probability refers to a probability that a risk caused by own factors (such as poor management) of an object occurs, and the inherent risk probability is based on target features of the object, where the target features are features that represent essential attributes of the object. For different types of objects, the target features of the objects are represented in different forms. For example, if the object is an enterprise, the target features of the object include: static features and dynamic features. The static features are used to represent basic attributes of the enterprise, such as registration time of the enterprise, or registered capital, and the static features do not change over time. The dynamic features refer to features of the enterprise that change over time. For example, if the object is an enterprise, the dynamic features may be the number of employees of the enterprise, a scale of the enterprise, or the like.

Since the static features may not change over time, in a basic information table including all enterprises, it is only necessary to delete the duplicate data in the entire data table according to enterprise IDs, then a static information table may be obtained, and the static information table may be input into a pre-established feature engineering, to obtain the static features.

In the basic information table of the enterprises, the enterprises are grouped according to the enterprise IDs, each group includes all historical change records of an enterprise, and data of each group is sorted based on change time to obtain change features in sequence. For the change features, a time-series feature extraction method may be used to extract features to obtain the dynamic features, where the time-series feature extraction method may include, for example, calculating slope, variance, change frequency, or the like.

Alternatively, the target features of the object may also include: behavior features, which are features of certain operations performed by the object. For example, if the object is an enterprise, the behavior features may be the number of companies, amount, and proportion invested by the enterprise.

Alternatively, the inherent risk probability of the to-be-tested object may be determined based on basic information of the to-be-tested object. Here, the basic information is information of the object when participating in production activities, and the basic information is information used to represent attributes, features and social relations of the to-be-tested object. For example, the basic information includes: a type and a quantity of the to-be-tested object, and relationships between the to-be-tested object and a plurality of different objects, or the like.

In the present embodiment, an executing body on which the method for predicting a risk is performed may acquire the basic information of the to-be-tested object in various methods. For example, the executing body may acquire the basic information stored in a database server through wired connection or wireless connection. As another example, a user may acquire the basic information of the to-be-tested object collected by a terminal by communicating with the terminal.

In the present embodiment, the determining an inherent risk probability of a to-be-tested object based on basic information of the to-be-tested object includes: inputting the basic information of the to-be-tested object into a pre-trained inherent risk model to obtain the inherent risk probability output by the inherent risk model, where the inherent risk model is used to represent a corresponding relationship between the basic information and the inherent risk probability.

In the technical solution of the present disclosure, the collection, storage, use, processing, transmission, provision and disclosure of the user personal information involved are all in compliance with the relevant laws and regulations, and do not violate public order and good customs.

In some alternative implementation of the present embodiment, the determining an inherent risk probability of a to-be-tested object, includes: determining static features, dynamic features and behavior features of the to-be-tested object; splicing the static features, the dynamic features, and the behavior features to obtain a target feature of the to-be-tested object; and inputting the target feature into a pre-trained inherent risk prediction model to obtain the inherent risk probability output by the inherent risk prediction model, where the inherent risk prediction model is used to represent a corresponding relationship between the target features and the inherent risk probability.

In this alternative implementation, the inherent risk prediction model may be obtained by training a model which is generated through automatic modeling. Automatic modeling is a fully automatic machine learning modeling method, which integrates various different models such as Knn (K Nearest Neighbors), Deepctr (Deep Click-Through-Rate). Automatic modeling can automatically perform feature building, model selection, hyperparameter search, and model integration, which can meet the requirements of high accuracy, high performance, etc. The training process of the inherent risk prediction model is as follows: first, importing sample data corresponding to the target features into an automatic modeling platform, and after different models inside the automatic modeling platform are trained, deploying and optimizing the models to obtain an optimal inherent risk prediction model.

In this alternative implementation, the static features, the dynamic features and the behavior features are spliced to constitute the target feature of the to-be-tested object. Based on the target feature, the inherent risk probability is predicted, which improves the reliability of predicting the inherent risk of the to-be-tested object.

Step 102 includes building a relationship graph between the to-be-tested object and different associated objects.

In the present embodiment, based on scenarios where the different objects are located and different interaction relationships between the objects, a plurality of associated objects having different association relationships with the to-be-tested object may be selected, and according to business relationships between the to-be-tested object and all the association relationships, the relationship graph between the to-be-tested object and the different associated objects may be built. The relationship graph includes a plurality of nodes and association relationships among the nodes, and the association relationships are different based on different properties of the nodes in the relationship graph. For example, the association relationships include a superior-subordinate relationship.

The building a relationship graph between the to-be-tested object and different associated objects includes: acquiring association relationships between the to-be-tested object and the different objects, establishing an association relationship table based on the association relationships, and building the relationship graph based on the association relationship table.

In the present embodiment, the association relationship table is a table used to represent multiple association relationships among different objects, and different types of objects present different association relationships. For example, if the object is an enterprise, the association relationship in the association relationship table may be a guarantee relationship; if the object is an individual, the association relationship may be a superior-subordinate relationship.

Common association relationships among objects are as follows: (1) Guarantee relationship, a contract break of a guaranteed object may have a certain impact on the guarantor. There is also the issue of closed-loop guarantees. Once an object is at risk, it may cause a chain reaction to other objects in a guarantee relationship circle. (2) Same senior executive relationship, the same senior executive may have behaviors such as robbing Peter to pay Paul, so a probability of risk conduction is high. (3) Equity relationship, when a parent company is at risk, an adverse impact may be caused on subsidiaries. (4) Group relationship, a plurality of objects belonging to the same group may have some invisible relationships, resulting in a certain conduction probability. (5) Supply chain relationship, once an object is at risk, it may adversely affect its upstream and downstream objects. (6) Kinship relationship, an object and the senior executive may be relatives, and there may be a relationship such as personal loan.

In the present embodiment, steps of building the relationship graph include: 1) extracting multiple relationships among objects, based on the association relationship table, such as the guarantee relationship, the same senior executive relationship, the equity relationship, the group relationship, the supply chain relationship, the kinship relationship, and is not limited to the above relationships; 2) creating entities in a graph database, e.g., the entities include various different objects. 3) creating node relationships in the graph database one by one, based on various association relationships obtained in step 1), and generating the relationship graph having a plurality of nodes.

Step 103 includes determining a primary conduction probability between any two directly associated objects in the relationship graph.

In the present embodiment, the primary conduction probability is a probability of risk arising from an association relationship between two objects that are directly associated with each other. The primary conduction probability of the to-be-tested object refers to a probability of an associated object spreading risk to the to-be-tested object due to a relationship between the associated object and the to-be-tested object, that is, a probability that the to-be-tested object is at risk because of an influence of the associated object. The primary conduction probability may be a risk probability obtained based on one of the different association relationships between the to-be-tested object and the associated objects in the relationship graph.

Based on different types of the association relationships between the to-be-tested object and the associated objects, a value of the primary conduction probability is different. For example, the association relationship between the to-be-tested object and an associated object is the guarantee relationship, and the association relationship between the to-be-tested object and another associated object is the superior-subordinate relationship, then the primary conduction probability between the to-be-tested object and an associated object is greater than the primary conduction probability between the to-be-tested object and another associated object.

It should be noted that, in an actual situation, the primary conduction probability between any two directly associated objects is a conduction probability that one of the two directly associated objects may conduct risk to its associated object after a risk occurs; if neither of the two directly associated objects is at risk, the primary conduction probability between the two directly associated objects is 0.

Step 104 includes determining, based on the primary conduction probability between any two directly associated objects in the relationship graph and the relationship graph, a multi-level conduction probability of the to-be-tested object.

In the present embodiment, all objects associated with the to-be-tested object in the relationship graph may be determined through the relationship graph, and the associated objects may include directly associated objects and indirectly associated objects. Based on the primary conduction probabilities between the to-be-tested object and any one of all objects, it may be further calculated whether an object at risk has conducted the risk to the to-be-tested object through multi-level conduction, and the multi-level conduction probability may be calculated due to the multi-level conduction. In the present embodiment, in addition to the objects directly associated with the to-be-tested object, objects that cause risks to the to-be-tested object may also be objects that are indirectly associated with the to-be-tested object. Therefore, multi-level conduction is a chain reaction phenomenon of risk between different objects, and the multi-level conduction probability is used to quantify a magnitude of a multi-level conduction risk. In the present embodiment, the multi-level conduction probability of an object is used to represent a total impact of risk conduction of the directly associated objects and the risk conduction of the indirectly associated objects on the risk of the object in the relationship graph.

The multi-level conduction probability of the to-be-tested object is a value calculated based on a conduction risk probability of the objects directly associated with the to-be-tested object and a conduction risk probability of the objects indirectly associated with the to-be-tested object. Specifically, if an object at risk is a directly associated object of the to-be-tested object, the multi-level conduction probability of the to-be-tested object is directly calculated by the primary conduction probability of the directly associated object; if an object at risk is an indirectly associated object of the to-be-tested object, it is necessary to determine whether the risk may be conducted through multi-level objects to the to-be-tested object based on the conduction risk probability of each indirectly associated object. If multi-level conduction occurs, the multi-level conduction probability of the to-be-tested object is calculated by the conduction risk probabilities of the indirectly associated objects of the to-be-tested object, and according to risk conduction relationships between the to-be-tested object and the plurality of risk objects, the multi-level conduction probability may be a second-level conduction probability, a third-level conduction probability, a fourth-level conduction probability and so on.

In the present embodiment, if any object in the relationship graph is at risk, in order to detect whether the risk may be conducted by other objects in the relationship graph to the to-be-tested object, a second-level associated object connected to the object at risk may be first determined, then a second-level conduction probability between the second-level associated object and the object at risk may be determined, based on the second-level conduction probability, it may be further determined whether the risk of the subordinate associated object may be conducted to a third-level associated object, if the risk may be conducted to the third-level associated object, a three-level conduction probability is calculated, further, a multi-level (great than three levels) conduction probability may be calculated, until it is determined that the object to which the risk is conducted is the to-be-tested object, then the multi-level conduction probability of the to-be-tested object may be obtained.

The determining, based on the primary conduction probability between any two directly associated objects in the relationship graph and the relationship graph, the multi-level conduction probability of the to-be-tested object, includes: detecting, based on the relationship graph, whether there are a plurality of risk objects associated with the to-be-tested object, and in response to only one risk object being associated with the to-be-tested object, (i.e., unilateral conduction) and the risk object being a directly associated object, determining the primary conduction probability between the to-be-tested object and the associated object as the multi-level conduction probability of the to-be-tested object, where the risk object is an object of historical or current risk in the relationship graph.

There may also be a plurality of risk objects that are at risk and conduct the risks to the to-be-tested object (i.e., multi-lateral conduction). The risk objects may be directly associated objects or indirectly associated objects or directly associated objects plus indirectly associated objects of the to-be-tested object. In a case that the to-be-tested object has association relationships with the plurality of risk objects, the to-be-tested object may be used as a terminal to find all objects associated with the to-be-tested object, that is, conduction edges, and the primary conduction probabilities of all conduction edges may be fused to obtain a parallel conduction probability. In some alternative implementations of the present embodiment, the determining, based on the primary conduction probability between any two directly associated objects in the relationship graph and the relationship graph, a multi-level conduction probability of the to-be-tested object, includes: detecting, based on the relationship graph, whether there are a plurality of risk objects associated with the to-be-tested object; in response to there being a plurality of risk objects, calculating a parallel conduction probability of the plurality of risk objects based on the primary conduction probability between any two directly associated objects in the relationship graph, where the parallel conduction probability is used to represent a fusion of primary conduction probabilities between a risk object and a plurality of directly associated objects of the risk object; and determining, based on the parallel conduction probability, the relationship graph and a preset multi-level conduction rule, the multi-level conduction probability of the to-be-tested object.

In the present embodiment, the risk objects associated with the to-be-tested object are objects at risks in the relationship graph, that is, objects of historical or current risk in the relationship graph.

In the present embodiment, the multi-level conduction rule includes detecting whether the parallel conduction probability is greater than or equal to a maximum preset threshold. If the parallel conduction probability is greater than the preset threshold, it may be determined that the risk may be conducted to a next level, and it may be determined that the to-be-tested object may have a multi-level conduction risk. The preset threshold may be determined based on all the primary conduction probabilities associated with the to-be-tested object (for example, a maximum primary conduction probability is selected as the preset threshold, or the maximum primary conduction probability is multiplied by a fixed coefficient as the preset threshold).

In this alternative implementation, if there are a plurality of risk objects, the multi-level conduction probability of the to-be-tested object is determined and further calculated by calculating the parallel conduction probability, which improves reliability of the obtained multi-level conduction probability.

In some alternative implementations of the present embodiment, the determining, based on the parallel conduction probability, the relationship graph and a preset multi-level conduction rule, the multi-level conduction probability of the to-be-tested object, includes: detecting whether the to-be-tested object has a multi-level conduction risk, based on the parallel conduction probability, the relationship graph and the preset multi-level conduction rule; and calculating, in response to the to-be-tested object having the multi-level conduction risk, the multi-level conduction probability of the to-be-tested object based on the parallel conduction probability.

In this alternative implementation, based on a product of the parallel conduction probability and primary conduction probabilities of multi-level objects, it may be finally determined whether the risk of the risk objects may be spread to the to-be-tested object. If the product of the parallel conduction probability and the primary conduction probabilities of multi-level objects from the level of object at risk to the level of the to-be-tested object, is smaller than a certain value, such as 0.001, it may be determined that the multi-level risk is not conducted to the to-be-tested object; if the product of the parallel conduction probability and the primary conduction probabilities of multi-level objects from the level of object at risk to the level of the to-be-tested object, is not smaller than this value, the product of the parallel conduction probability and the primary conduction probabilities of multi-level objects from the level of object at risk to the level of the to-be-tested object, is used as the multi-level conduction probability of the to-be-tested object.

The method for determining a multi-level conduction probability provided by this alternative implementation, first detects whether the to-be-tested object may be multi-level conducted. After determining that the to-be-tested object has a multi-level conduction risk, the multi-level conduction probability of the to-be-tested object is calculated to ensure the reliability of calculating the multi-level conduction probability.

Alternatively, in response to detecting that the risk object is associated with only one associated object, based on the primary conduction probability of the risk object, whether the to-be-tested object has a multi-level conduction risk is detected; in response to the to-be-tested object having the multi-level conduction risk, through the primary conduction probabilities of any two objects between the risk object and the to-be-tested object, the multi-level conduction probability of the to-be-tested object is calculated. It should be noted that it is possible to determine whether the to-be-tested object may have a multi-level conduction risk by a magnitude of the product of the primary conduction probabilities between the risk object and the associated objects at all levels. If the product of all the primary conduction probabilities of objects from the risk object to the to-be-tested object is already very small, it may be determined that the to-be-tested object may not have a multi-level conduction risk.

In some alternative implementations of the present embodiment, the detecting, based on the parallel conduction probability, the relationship graph and the preset multi-level conduction rule, whether the to-be-tested object has a multi-level conduction risk, includes: detecting whether the parallel conduction probability meets a conduction stop condition; and detecting, in response to the parallel conduction probability not meeting the conduction stop condition, based on the parallel conduction probability, the relationship graph and the preset multi-level conduction rule, whether the to-be-tested object has a multi-level conduction risk.

In this alternative implementation, the parallel conduction probability is constrained by the conduction stop condition, which ensures the reliability of calculating the multi-level conduction probability.

Figure 2:
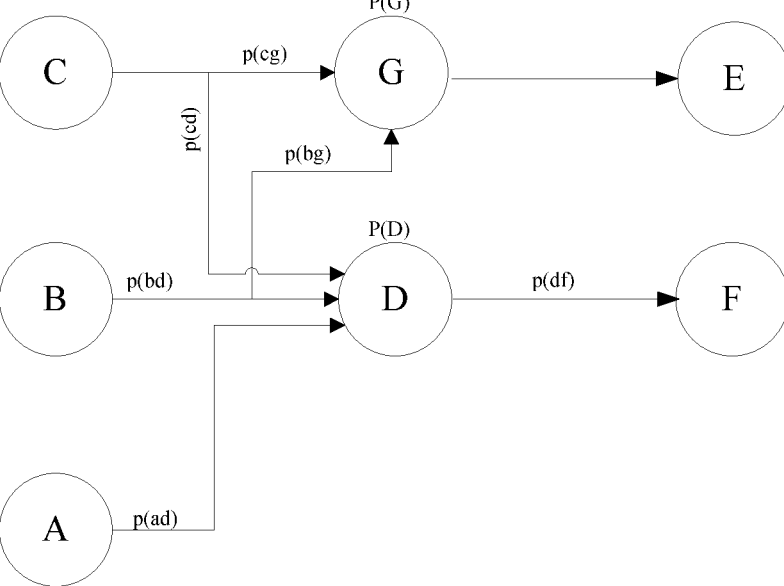
FIG. 2 is a schematic structural diagram of determining a multi-level conduction probability of a to-be-tested object in an embodiment of the present disclosure.

As shown in FIG. 2, objects associated with a to-be-tested object F in a relationship graph include: object A, object B, object C, object G, and object E, where to-be-tested object D is a directly associated object of the to-be-tested object F, and the object A, the object B, the object C, the object G, and the object E are indirectly associated objects of the to-be-tested object F. When the object A, the object B, and the object C are risk objects, a primary conduction probability of the object A and the object D is p (ad), a primary conduction probability of the object B and the object D is p (bd), and a primary conduction probability of the object C and the object D is p (cd), then a parallel conduction probability P of the risk objects is calculated by equation (1).

$$P=1/(1+(n+1)^{p\_sum}) \tag{1}$$

In equation (1), p_sum is a sum of all the primary conduction probabilities between the risk objects and the object directly associated with the risk objects, and n is the number of directly associated objects. In FIG. 2, $P(D)=1/(1+4^{p(ad)+p(bd)+p(cd)})$.

Further, if P(D) in P(D) and P(G) is greater than a preset threshold, it may be determined that the to-be-tested object D may have second-level conduction risk. Here, P(G) is the parallel conduction probability of the object G calculated for the object G, and P(G) is calculated by using p(cg) and p(bg). In this regard, a second-level conduction probability of the to-be-tested object F may be calculated as: P(df)=P(D)×p(df), where p(df) is the primary conduction probability between the to-be-tested object F and the conducting object D. If P(G) is smaller than the preset threshold, the object G may not conduct risk downwards, and the risk may not be passed to the object E through the object G.

In this alternative implementation, a to-be-tested object may have association relationships with a plurality of objects. Using the to-be-tested object as an end point, associated objects associated with the to-be-tested object are found, and the primary conduction probabilities between the to-be-tested object and all the found associated objects are fused. The calculation of the parallel conduction probability conforms to monotonically increasing, that is, the parallel conduction probability increases with the increase of conduction edges (connection between the to-be-tested object and the associated objects), and rises with the increase of a sum of the probabilities of the conduction edges.

The calculation of the parallel conduction probability includes, but is not limited to, the calculation method shown in equation (1). Alternatively, according to an importance of conduction relationships between the risk objects and each directly associated object, weight values q may be set for the directly associated objects directly associated with the risk objects, and the parallel conduction probability may be calculated using the weight values and the primary conduction probabilities of the risk objects and the directly associated objects. Using FIG. 2 as an example, the parallel conduction probability may be equal to q1*p(ad)+q2*p(bd)+q3*p(cd), where q1 is the weight value between the risk object A and the object D, q2 is the weight value between the risk object B and the object D, and q3 is the weight value between the risk object C and the object D. The values of q1, q2, and q3 are determined by the importance of the specific conduction relationships between the different risk objects and the directly associated objects.

In this alternative implementation, if the risk objects are associated with a plurality of associated objects, the parallel conduction probability of the risk objects is calculated, and it is detected whether the parallel conduction probability of the risk objects meets the conduction stop condition, if the conduction stop condition is not met, whether the to-be-tested object has a multi-level conduction risk is detected, if multi-level conduction occurs, the multi-level conduction probability of the to-be-tested object is calculated, which improves the reliability of calculating the multi-level conduction probability of the to-be-tested object.

In another alternative implementation of the present embodiment, the determining, based on the primary conduction probability between any two directly associated objects in the relationship graph and the relationship graph, the multi-level conduction probability of the to-be-tested object, further includes: in response to the parallel conduction probability meeting a conduction stop condition, using the parallel conduction probability as the multi-level conduction probability of the to-be-tested object, if the plurality of risk objects are directly associated with the to-be-tested object.

In this alternative implementation, in response to the parallel conduction probability meeting the conduction stop condition, if the risk objects are directly associated with the to-be-tested object, the parallel conduction probability is used as the multi-level conduction probability, ensuring effectiveness of stopping multi-level conduction risk of the to-be-tested object.

Alternatively, there is also a chain conduction relationship in the risk conduction of objects. Therefore, for a multi-level conduction relationship with a plurality of parallel conduction probabilities of the plurality of risk objects, the plurality of parallel conduction probabilities may be divided according to different thresholds to find the highest threshold. The highest threshold is used to determine whether an object corresponding to the highest threshold is used as a conduction starting point for the next level of conduction, and a multi-level conduction probability of a subordinate node having an association relationship with the object is calculated. Here, an operation result of multiplying the parallel conduction probability of the starting point by the primary conduction probability between the to-be-tested object and the subordinate node is used as the multi-level conduction probability of the subordinate node.

Step 105 includes determining a target risk probability of the to-be-tested object, based on the inherent risk probability and the multi-level conduction probability of the to-be-tested object.

In the present embodiment, the target risk probability of the to-be-tested object may be obtained by a weighted summation of the inherent risk probability and the multi-level conduction probability.

Alternatively, a fusion equation shown in Equation (2) may also be used to obtain the target risk probability of the to-be-tested object.

$$P(i)=1-(1-P_c)\times(1-P_y) \tag{2}$$

In Equation (2), $P_c$ is the multi-level conduction probability of the to-be-tested object, $P_y$ is the inherent risk probability of the to-be-tested object, and P(i) is the target risk probability of the to-be-tested object.

The method for predicting a risk provided by embodiments of the present disclosure, first determines an inherent risk probability of a to-be-tested object; secondly, builds a relationship graph between the to-be-tested object and different associated objects; thirdly, determines a primary conduction probability between any two directly associated objects in the relationship graph; fourthly, determines, based on the primary conduction probability between any two directly associated objects in the relationship graph and the relationship graph, a multi-level conduction probability of the to-be-tested object; and finally, determines a target risk probability of the to-be-tested object, based on the inherent risk probability and the multi-level conduction probability of the to-be-tested object. The present disclosure first predicts the inherent risk probability of the to-be-tested object, predicts the multi-level conduction probability of multi-level risk conduction between the to-be-tested object and the objects by using the association relationships among the plurality of objects, and finally combines the inherent risk probability with the multi-level conduction probability to predict a probability of future risk of the to-be-tested object, which improves an accuracy of risk prediction.

In some alternative implementations of the present embodiment, the determining a primary conduction probability between any two directly associated objects in the relationship graph, includes: determining, based on the relationship graph, all associated objects associated with the to-be-tested object; determining conduction relationship pairs based on all the associated objects associated with the to-be-tested object, each of the conduction relationship pairs having a direct association relationship; determining, based on the relationship graph, conduction edge features of the conduction relationship pair; and inputting the conduction relationship pairs and the conduction edge features into a pre-trained conduction probability model to obtain the primary conduction probability between any two directly associated objects output by the conduction probability model; where the conduction probability model is used to represent a corresponding relationship between each conduction relationship pair having the conduction edge features and the primary conduction probability.

In the present embodiment, the conduction relationship pair refers to a conduction relationship formed by two associated objects having a direct association relationship. The associated objects may be directly associated objects that have direct association relationships with the to-be-tested object in the relationship graph, or may be indirectly associated objects that have indirect association relationships with the to-be-tested object.

In this alternative implementation, first the associated objects may be determined, then the conduction relationship pair having a local direct association relationship in the relationship graph is determined, where the conduction relationship pair is a relationship pair having a risk conduction relationship, one party of the relationship pair is an object in the relationship graph, and the other party is a directly associated object that has a direct association relationship with the object; based on the relationship graph, the conduction edge features of the conduction relationship pair may be determined, where the conduction edge features are features used to reflect risk conduction between the conduction relationship pair, for example, the conduction edge features are subordinate features.

In the present embodiment, the conduction relationship pair and the conduction edge features are input into the conduction probability model, so that the conduction probability model may analyze in real time, and determine the primary conduction probability of the conduction relationship pair of the conduction edge features.

In this alternative implementation, the conduction edge features of the conduction relationship pair are determined, and the conduction relationship pair and the conduction edge features are input into the pre-trained conduction probability model to obtain the primary conduction probability output by the conduction probability model, which improves an accuracy of the obtained primary conduction probability.

In some alternative implementations of the present embodiment, the conduction probability model is trained through following steps: building conduction sample pairs based on the relationship graph; labeling a pseudo-tag on each conduction sample pair; performing feature processing on a conduction edge of each tag-labeled conduction sample pair based on the relationship graph, to obtain conduction feature association pairs, where a conduction feature association pair includes: a plurality of conduction sample pairs with pseudo-tags and conduction edge features corresponding to the conduction sample pairs; and training a pre-built conduction probability network based on the conduction feature association pairs, to obtain the trained conduction probability model.

In this alternative implementation, the conduction sample pair only represents an association relationship between two objects, but cannot explain the relationship between the two objects in the conduction sample pair. Feature processing is performed on the conduction edges of the tag-labeled conduction sample pairs, and the conduction edge features (such as guarantee duration, or guarantee amount) are added to the conduction sample pairs, which ensures diversity of manifestations of the conduction feature association pairs.

In this alternative implementation, the conduction probability model is trained by using the conduction feature association pairs obtained by performing feature processing on the conduction samples, which may ensure the reliability of prediction results of the trained conduction probability model.

In some alternative implementations of the present embodiment, the conduction probability model is trained through following steps: building the conduction sample pairs by using a sliding window based on the relationship graph; performing pseudo-tag labeling on the conduction sample pairs based on the sliding window; performing feature processing on a conduction edge of each tag-labeled conduction sample pair based on the relationship graph, to obtain conduction feature association pairs, where the conduction feature association pair includes: a plurality of conduction sample pairs with pseudo-tags and conduction edge features corresponding to the conduction sample pairs; and training a pre-built conduction probability network based on the conduction feature association pairs, to obtain the trained conduction probability model.

In this alternative implementation, the conduction sample pair is two samples having a risk conduction relationship, and the two samples are two entities having an association relationship in the relationship graph.

In this alternative implementation, the sliding window is a sliding time window. Since risk conduction has obvious time attributes, when building the conduction sample pairs and performing pseudo-tag labeling on the conduction sample pairs, the sliding time window is used, which may effectively represent time features of the conduction samples and improve the reliability of sample building and labeling.

In this alternative implementation, the sliding window is used to build the conduction sample pairs, and pseudo-tag labeling is performed on the conduction sample pairs, which improves the reliability of sample building and labeling.

In some alternative implementations of the present embodiment, the training the pre-built conduction probability network based on the conduction feature association pairs, includes: correcting the conduction feature association pairs; and training the pre-built conduction probability network based on the corrected conduction feature association pairs.

In this alternative implementation, the correcting the conduction feature association pairs may include: correcting the conduction sample pairs in the conduction feature association pairs (e.g., removing conduction sample pairs that do not have a conduction relationship) and/or correcting the pseudo-tags of the conduction sample pairs (e.g., based on a preset corresponding relationship between a conduction sample and a tag, updating a pseudo-tag of a current conduction sample pair, so that the updated tag matches the corresponding relationship between the conduction sample and the tag).

In this alternative implementation, the correction of the conduction feature association pairs improves the reliability of the obtained conduction feature association pairs, and provides a reliable basis for training a reliable conduction probability model.

FIG. 3 shows a flow 300 of an embodiment of a method for training a conduction probability model according to the present disclosure. The method for training a conduction probability model includes the following steps:

Step 301, building the conduction sample pairs by using a sliding window based on the relationship graph.

In the present embodiment, since risk conduction has obvious time attributes, the conduction sample pairs may be built by using the sliding window. The conduction sample pair is two samples having a risk conduction relationship, and the two samples are two entities having an association relationship in the relationship graph.

As shown in FIG. 4, a sliding window includes: an initial period a and a conduction period b. A period of time as the initial period a is set, for example, the initial period a is a period ranging from one month to one quarter, and a period after the initial period a is set as the conduction period b, for example, the conduction period b is a period ranging from one quarter to half a year. A process of building conduction sample pairs is as follows: fixing the sliding window, selecting a sample at the initial period a of the sliding window as a risk initial point, and then finding an entity associated with the sample as an end point according to an association relationship in the relationship graph, the initial point and the end point forming a conduction sample pair. Next, the sliding window is slid backward for a period of time t, such as a time value between one month and one quarter, and then conduction sample pairs are built sequentially. A plurality of conduction samples may be arbitrarily selected from all conduction sample pairs generated by sliding the sliding window multiple times as the finally built conduction sample pairs.

In some alternative implementations of the present embodiment, the building the conduction sample pairs using a sliding window based on the relationship graph, includes: selecting a sample at risk in the initial period as an initial node; determining, based on the relationship graph, a termination node associated with the initial node in the conduction period; and using the initial node and the termination node as the conduction sample pair.

Alternatively, the building the conduction sample pairs using a sliding window based on the relationship graph, also includes: setting a period of time using the sliding window, then selecting a sample at risk in the initial period of a new sliding window as an initial node; determining, based on the relationship graph, a termination node associated with the initial node in the conduction period of the new sliding window; and using the initial node and the termination node as the conduction sample pair.

In this alternative implementation, the initial node is a node in the relationship graph, and the termination node is another node in the relationship graph. Based on the association relationships between the plurality of nodes in the relationship graph and the sliding window, two nodes having an association relationship and respectively in the initial period and the conduction period of the sliding window are selected as the conduction sample pair, which improves the reliability of conduction sample pair selection.

Step 302 includes performing pseudo-tag labeling on each conduction sample pair based on the sliding window.

In the present embodiment, since which risk is causing the overdue between two objects can not be accurately distinguished, pseudo-tags for conduction edges between any two of all objects are first built based on the sliding window. Due to the hysteresis of risk conduction, a date of risk conduction at an end of the sliding window must be within a period of time after a risk at the initial point, and this period of time may be called a latency period. The latency period may be specifically set according to object features, for example, the latency period may be set between 1-6 months, but is not limited to this period of time. If a risk occurs in this period of time, the pseudo-tag is 1; and if there is no risk, the pseudo-tag is 0.

Alternatively, the conduction period of the sliding window may also be used as the latency period for pseudo-tag labeling. In some alternative implementations of the present embodiment, the performing pseudo-tag labeling on each conduction sample pair based on the sliding window, includes: in response to the termination node being at risk in the conduction period, labeling the termination node with a pseudo-tag of conducted risk.

Alternatively, if the termination node of the sliding window does not have any risk in the conduction period, the termination node is labeled with a pseudo-tag of unconducted risk.

In this alternative implementation, if the termination node is at risk in the conduction period, the termination node is labeled with a pseudo-tag of conducted risk, which provides a reliable basis for tag-labeling of samples.

Step 303 includes performing feature processing on a conduction edge of each tag-labeled conduction sample pair based on the relationship graph, to obtain conduction feature association pairs.

The conduction feature association pairs include: a plurality of conduction sample pairs with pseudo-tags and conduction edge features corresponding to the conduction sample pairs.

In this alternative implementation, the conduction sample pair only represents an association relationship between two objects, but cannot explain the relationship between the two objects in the conduction sample pair. Feature processing is performed on a conduction edge of each tag-labeled conduction sample pair, and the conduction edge features (such as guarantee duration, or guarantee amount) are added to the conduction sample pairs, which ensures diversity of manifestations of the conduction feature association pairs.

Step 304 includes correcting the conduction feature association pairs.

In the present embodiment, a preset corresponding relationship table between the conduction edge features and risk tags may be used, where the risk tags are used to indicate whether a risk has occurred or not. The corresponding relationship table is used to represent corresponding relationships between conduction edge features and risks, and the correcting the conduction feature association pairs includes: determining a risk tag of a conduction feature association pair based on a corresponding relationship, comparing the determined risk tag with a pseudo-tag of the conduction feature association pair, and removing the conduction feature association pair, in response to the determined risk tag being different from the pseudo-tag.

Alternatively, the correcting the conduction feature association pairs includes: determining a risk tag of a conduction feature association pair based on a corresponding relationship, comparing the determined risk tag with a pseudo-tag of the conduction feature association pair, and modifying the pseudo-tag to the determined risk tag, in response to the determined risk tag being different from the pseudo-tag.

In some alternative implementations of the present embodiment, the correcting the conduction feature association pairs includes: comparing pseudo-tags of the plurality of conduction sample pairs in the conduction feature association pairs with pre-obtained probability predicted values and determining differences between the pseudo-tags and the probability predicted values; performing outlier detection on the differences and removing conduction sample pairs having abnormal differences in the conduction feature association pairs to obtain the corrected conduction feature association pairs; and using the probability predicted values as tags of the corrected conduction feature association pairs.

In this alternative implementation, the probability predicted values are values obtained by performing binary classification on the conduction sample pairs in the conduction feature association pairs through a pre-trained binary classifier.

In this alternative implementation, the pseudo-tags are compared with the probability predicted values, to obtain the corrected conduction feature association pairs, which provides a reliable method for obtaining the corrected conduction feature association pairs.

In some alternative implementations of the present embodiment, the probability predicted values are obtained by: using a K-fold cross-validation algorithm, where a part of the plurality of conduction sample pairs in each conduction feature association pair are used as a training set, conduction sample pairs other than the part of the plurality of conduction sample pairs in the conduction feature association pairs are used as a prediction set, and a binary classifier is trained by using the training set and the prediction set to obtain the probability predicted values of the conduction feature association pairs.

In this alternative implementation, the K-fold cross-validation algorithm is used to adjust and optimize the conduction probability model, and hyperparameter values that optimize a generalization performance of the conduction probability model are found. The conduction probability model is retrained by using all training sets, and an independent test set that makes a final evaluation of the performance of the conduction probability model is used. The advantage of using K-fold cross-validation is that in each iteration of the conduction probability model, each sample node has only one chance to be included in the training set or the test set.

In this alternative implementation, first, the K-fold cross-validation algorithm may use k−1 (k>1) parts of a plurality of conduction relationship pairs as the training set, and the remaining parts of the plurality of conduction relationship pairs as the prediction set, and use the binary classifier for training and prediction. After k times of verification, the probability predicted value of risk occurrence for each conduction relationship pair is obtained. The pseudo-tag of each conduction relationship pair is compared with its probability predicted value, and a difference between the two is obtained. Outlier detection is performed on the difference between the pseudo-tag and the predicted probability. Here, during outlier detection, for one-dimensional data, the Three-sigma rule may be used to detect abnormal data, to mark conduction relationship pairs that have problems. For abnormal conduction relationship pairs, correct tags cannot be accurately and clearly given, so such conduction relationship pairs are eliminated as noise samples. The remaining conduction relationship pairs are labeled with the predicted probability values, representing the primary conduction probabilities of the conduction edges of the conduction relationship pairs.

The Three-sigma rule, also known as the Laida criterion, first assumes that a set of test data contains only random errors, then calculates and processes the data to obtain a standard deviation, and determines an interval according to a certain probability. It is considered that any error exceeding this interval is not a random error but a gross error, and data containing the error should be eliminated.

In this alternative implementation, the K-fold cross-validation algorithm is used to correct the conduction feature association pairs, which improves the reliability of obtaining the conduction feature association pairs and the tags of the conduction feature association pairs, and further ensures the reliability of training the conduction probability model.

In some alternative implementations of the present embodiment, the correcting the conduction feature association pairs may further include: using the probability predicted values as tags of the corrected conduction feature association pairs.

In this alternative implementation, the probability predicted values are directly used as the tags of the corrected conduction feature association pairs, which provides a reliable implementation for pseudo-tag correction of the conduction feature association pairs.

Step 305, training the pre-built conduction probability network based on the corrected conduction feature association pairs, to obtain the trained conduction probability model.

The conduction probability model is used to represent a corresponding relationship between the conduction relationship pair of the conduction relationship pair and the primary conduction probability, and a corresponding relationship between the conduction edge features of the conduction relationship pair and the primary conduction probability.

In the present embodiment, the conduction probability model may be obtained by training a model which is generated through automatic modeling. Automatic modeling is a fully automatic machine learning modeling method. Automatic modeling can automatically perform feature building, model selection, hyperparameter search, and model integration, which can meet the requirements of high accuracy, high performance, etc. The training process of the conduction probability model is as follows: first, importing sample data corresponding to the corrected conduction feature association pairs into an automatic modeling platform, after different models are trained inside the automatic modeling platform, deploying and optimizing the models to obtain an optimal conduction probability model.

The method for training a conduction probability model provided by the present embodiment, uses the sliding window to label tags, and corrects the conduction feature association pairs, which ensures reliability of the samples and improves a prediction accuracy of the conduction probability model.

Figure 5:
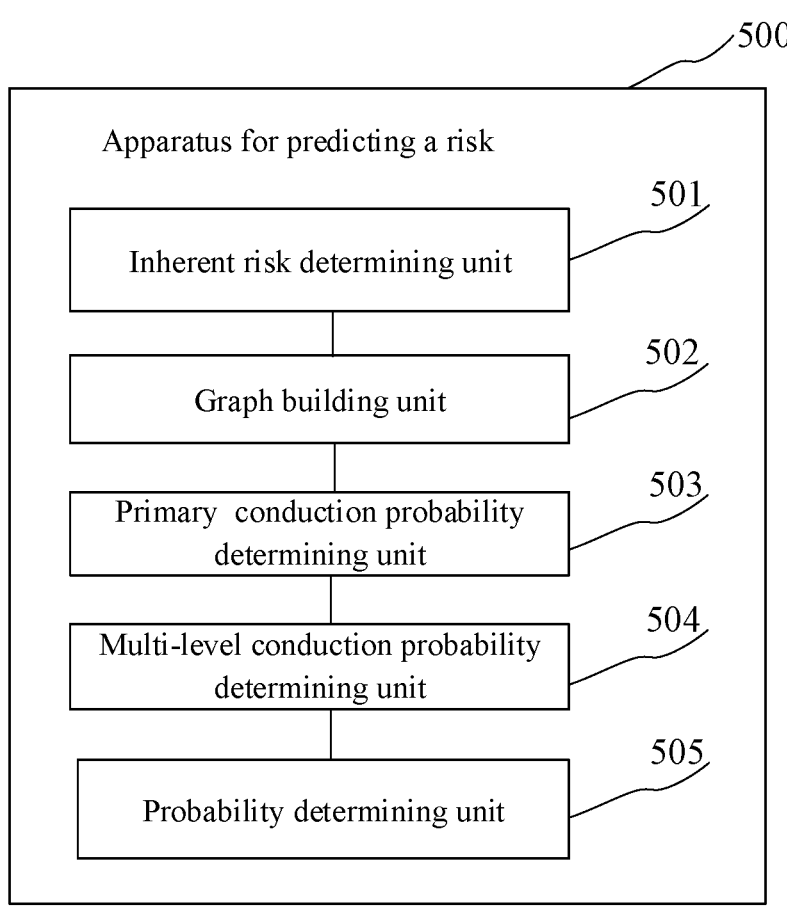
FIG. 5 is a schematic structural diagram of an embodiment of an apparatus for predicting a risk according to the present disclosure.

With further reference to FIG. 5, as an implementation of the method shown in the above figures, the present disclosure provides an embodiment of an apparatus for predicting a risk, and the apparatus embodiment corresponds to the method embodiment shown in FIG. 1. The apparatus may be applied to various electronic devices.

As shown in FIG. 5, the apparatus 500 for predicting a risk in the present embodiment includes: an inherent risk determining unit 501, a graph building unit 502, a primary conduction probability determining unit 503, a multi-level conduction probability determining unit 504 and a probability determining unit 505. The inherent risk determining unit 501 is configured to determine an inherent risk probability of a to-be-tested object. The graph building unit 502 is configured to build a relationship graph between the to-be-tested object and different associated objects. The primary determining unit 503 is configured to determine a primary conduction probability between any two directly associated objects in the relationship graph. The multi-level determining unit 504 is configured to determine, based on the primary conduction probability between any two directly associated objects in the relationship graph and the relationship graph, a multi-level conduction probability of the to-be-tested object. The probability determining unit 505 is configured to determine a target risk probability of the to-be-tested object, based on the inherent risk probability and the multi-level conduction probability of the to-be-tested object.

In the present embodiment, in the apparatus 500 for predicting a risk, for the specific processing and the technical effects of the inherent risk determining unit 501, the graph building unit 502, the primary conduction probability determining unit 503, the multi-level conduction probability determining unit 504 and the probability determining unit 505, reference may be made to the relevant descriptions of step 101, step 102, step 103, step 104 and step 105 in the corresponding embodiment of FIG. 1 respectively, and detailed description thereof will be omitted.

In some alternative implementations of the present embodiment, the multi-level conduction probability determining unit 504 includes: an object detecting subunit (not shown in the figure), a parallel calculating subunit (not shown in the figure) and a conduction determining subunit (not shown in the figure). The object detecting subunit may be configured to detect, based on the relationship graph, whether there are a plurality of risk objects associated with the to-be-tested object, where the risk objects are objects of historical or current risk in the relationship graph. The parallel calculating subunit may be configured to, in response to there being a plurality of risk objects associated with the to-be-tested object, calculate a parallel conduction probability of the plurality of risk objects based on the primary conduction probability between any two directly associated objects in the relationship graph, wherein the parallel conduction probability is used to represent a fusion of primary conduction probabilities between a risk object and a plurality of directly associated objects of the risk object. The conduction determining subunit may be configured to determine, based on the parallel conduction probability, the relationship graph and a preset multi-level conduction rule, the multi-level conduction probability of the to-be-tested object.

In some alternative implementations of the present embodiment, the conduction determining subunit includes: a conduction detecting module (not shown in the figure) and a calculating module (not shown in the figure). The conduction detecting module may be configured to detect, based on the parallel conduction probability, the relationship graph and the preset multi-level conduction rule, whether the to-be-tested object has the multi-level conduction risk. The calculating module may be configured to calculate, in response to the to-be-tested object having the multi-level conduction risk, based on the parallel conduction probability, the multi-level conduction probability of the to-be-tested object.

In some alternative implementations of the present embodiment, the conduction detecting module includes: a detecting submodule (not shown in the figure) and a conduction submodule (not shown in the figure). The detecting submodule may be configured to detect whether the parallel conduction probability meets a conduction stop condition. The conduction submodule may be configured to detect, in response to the parallel conduction probability not meeting the conduction stop condition, based on the parallel conduction probability, the relationship graph and the preset multi-level conduction rule, whether the to-be-tested object has a multi-level conduction risk.

In some alternative implementations of the present embodiment, the multi-level conduction probability determining unit 504 further includes: a probability using module (not shown in the figure). The probability using module may be configured to, in response to the parallel conduction probability meeting a conduction stop condition, use the parallel conduction probability as the multi-level conduction probability of the to-be-tested object, if the plurality of risk objects are directly associated with the to-be-tested object.

In some alternative implementations of the present embodiment, the primary conduction probability determining unit 503 includes: an object determining module (not shown in the figure), a relationship determining module (not shown in the figure), an edge feature determining module (not shown in the figure) and an inputting module (not shown in the figure). The object determining module may be configured to determine, based on the relationship graph, all associated objects associated with the to-be-tested object. The relationship determining module may be configured to determine conduction relationship pairs based on all the associated objects associated with the to-be-tested object, each of the conduction relationship pairs having a direct association relationship. The edge feature determining module may be configured to determine, based on the relationship graph, conduction edge features of the conduction relationship pair. The inputting module may be configured to input the conduction relationship pairs and the conduction edge features of each conduction relationship pair into a pre-trained conduction probability model to obtain the primary conduction probability between any two directly associated objects output by the conduction probability model; where the conduction probability model is used to represent a corresponding relationship between each conduction relationship pair having the conduction edge features and the primary conduction probability.

In some alternative implementations of the present embodiment, the conduction probability model is trained by using units as follows: a sample pair building unit (not shown in the figure), a labeling unit (not shown in the figure), a processing unit (not shown in the figure) and a training unit (not shown in the figure). The sample pair building unit may be configured to build conduction sample pairs based on the relationship graph. The labeling unit may be configured to label a pseudo-tag on each of the conduction sample pairs. The processing unit may be configured to perform feature processing on a conduction edge of each tag-labeled conduction sample pair based on the relationship graph, to obtain conduction feature association pairs, where a conduction feature association pair of the conduction feature association pairs includes: a plurality of conduction sample pairs with pseudo-tags and conduction edge features corresponding to the conduction sample pairs. The training unit may be configured to train a pre-built conduction probability network based on the conduction feature association pairs, to obtain the trained conduction probability model.

In some alternative implementations of the present embodiment, the sample pair building unit is further configured to: build the conduction sample pairs by using a sliding window based on the relationship graph; and the labeling unit is further configured to: perform pseudo-tag labeling on each conduction sample pair based on the sliding window.

In some alternative implementations of the present embodiment, the sliding window includes: an initial period and a conduction period; and the sample pair building unit includes: a selecting module (not shown in the figure), a node determining module (not shown in the figure) and a sample using module (not shown in the figure). The selecting module may be configured to select a sample at risk in the initial period as an initial node. The node determining module may be configured to determine, based on the relationship graph, a termination node associated with the initial node in the conduction period. The sample using module may be configured to use the initial node and the termination node as the conduction sample pair. The labeling unit is further configured to: in response to the termination node being at risk in the conduction period, label the termination node with a pseudo-tag of conducted risk.

In some alternative implementations of the present embodiment, the training unit includes: a correcting module (not shown in the figure) and a training module (not shown in the figure). The correcting module may be configured to correct the conduction feature association pairs. The training module may be configured to train the pre-built conduction probability network based on the corrected conduction feature association pairs.

In some alternative implementations of the present embodiment, the correcting module includes: a comparing submodule (not shown in the figure) and an abnormity detecting submodule (not shown in the figure). The comparing submodule may be configured to compare pseudo-tags of the plurality of conduction sample pairs in the conduction feature association pairs with pre-obtained probability predicted values and determine differences between the pseudo-tags and the probability predicted values. The abnormity detecting submodule may be configured to perform outlier detection on the differences and remove conduction sample pairs having abnormal differences in the conduction feature association pairs to obtain the corrected conduction feature association pairs.

In some alternative implementations of the present embodiment, the probability predicted values may be acquired through a predicting unit (not shown in the figure). The predicting unit may be configured to use a part of the plurality of conduction sample pairs in each conduction feature association pair as a training set, use conduction sample pairs other than the part of the plurality of conduction sample pairs in each conduction feature association pair as a prediction set, and train and predict a binary classifier by using the training set and the prediction set to obtain the probability predicted values.

The correcting module may be further configured to use the probability predicted values as tags of the corrected conduction feature association pairs.

In some alternative implementations of the present embodiment, the inherent risk determining unit 501 includes: a feature determining module (not shown in the figure), a splicing module (not shown in the figure) and a probability obtaining module (not shown in the figure). The feature determining module may be configured to determine static features, dynamic features and behavior features of the to-be-tested object. The splicing module may be configured to splice the static features, the dynamic features, and the behavior features to obtain a target feature of the to-be-tested object. The probability obtaining module may be configured to input the target feature into a pre-trained inherent risk prediction model to obtain the inherent risk probability output by the inherent risk prediction model, where the inherent risk prediction model is used to represent a corresponding relationship between the target features and the inherent risk probability.

The apparatus for predicting a risk provided by the above embodiment of the present disclosure, first, the inherent risk determining unit 501 determines a inherent risk probability of a to-be-tested object; secondly, the graph building unit 502 builds a relationship graph between the to-be-tested object and different associated objects; thirdly, the primary conduction probability determining unit 503 determines a primary conduction probability between any two directly associated objects in the relationship graph; fourthly, the multi-level conduction probability determining unit 504 determines, based on the primary conduction probability and the relationship graph, a multi-level conduction probability of the to-be-tested object; and finally, the probability determining unit 505 determines a target risk probability of the to-be-tested object, based on the inherent risk probability and the multi-level conduction probability of the to-be-tested object. The present disclosure first predicts the inherent risk probability of the to-be-tested object, predicts the multi-level conduction probability of multi-level risk conduction between the to-be-tested object and the objects by using the association relationship between the plurality of objects, and finally combines the inherent risk probability with the multi-level conduction probability to predict a probability of future risk of the to-be-tested object, which improves an accuracy of risk prediction.

In the technical solution of the present disclosure, the collection, storage, use, processing, transmission, provision and disclosure of the user personal information involved are all in compliance with the relevant laws and regulations, and do not violate public order and good customs.

According to an embodiment of the present disclosure, the present disclosure also provides an electronic device, a readable storage medium and a computer program product.

Figure 6:
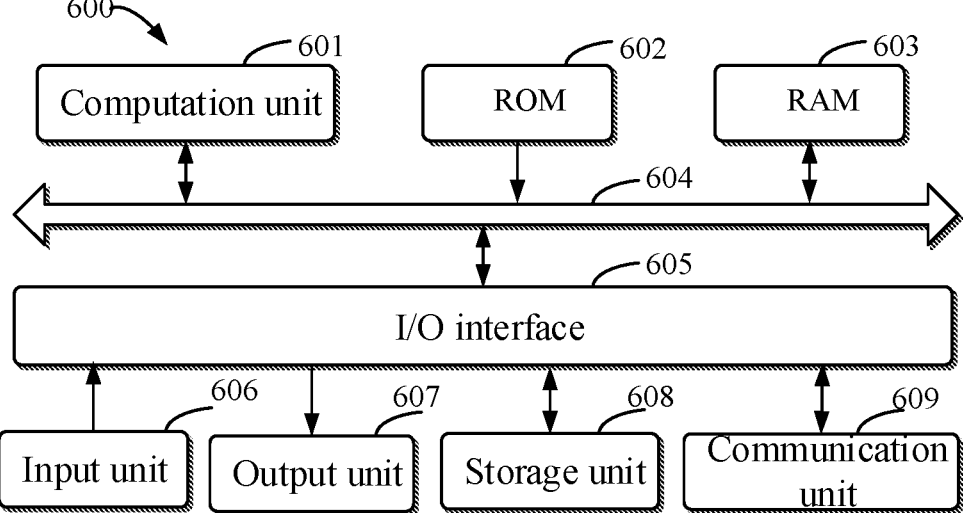
FIG. 6 is a block diagram of an electronic device used to implement the method for predicting a risk of embodiments of the present disclosure.

FIG. 6 shows a schematic block diagram of an example electronic device 600 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 6, the device 600 includes a computation unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computation unit 601, the ROM 602, and the RAM 603 are connected to each other through a bus 604. An input/output (I/O) interface 605 is also connected to the bus 604.

A plurality of parts in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computation unit 601 may be various general-purpose and/or dedicated processing components having processing and computing capabilities. Some examples of the computation unit 601 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 601 performs the various methods and processes described above, such as the method for predicting a risk. For example, in some embodiments, the method for predicting a risk may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computation unit 601, one or more steps of the method for predicting a risk described above may be performed. Alternatively, in other embodiments, the computation unit 601 may be configured to perform the method for predicting a risk by any other appropriate means (for example, by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, a distributed system server, or a blockchain server.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A computer-implemented method for quantifying risk propagation in complex network data structures by addressing temporal risk conduction lag using a trained network, the method comprising performing by computer:

generating an inherent risk probability of a to-be-tested object, the generating comprising processing static features representing basic attributes of the to-be-tested object, and extracting dynamic features of the object from historical data using a time-series feature extraction process;

building a relationship graph between the to-be-tested object and different associated objects, wherein the relationship graph comprises a plurality of nodes and association relationships among the nodes, and the building the relationship graph comprises extracting association relationships among the objects, creating entities in a graph database, creating node relationships in the graph database based on the association relationships, and constructing the relationship graph from the graph database;

determining a primary conduction probability between any two directly associated objects in the relationship graph, comprising determining, based on the relationship graph, all associated objects associated with the to-be-tested object, determining conduction relationship pairs based on all the associated objects associated with the to-be-tested object, each of the conduction relationship pairs having a direct association relationship, determining, based on the relationship graph, conduction edge features of each conduction relationship pair, and inputting the conduction relationship pairs and the conduction edge features of each conduction relationship pair into a pre-trained conduction probability model stored in memory to obtain the primary conduction probability between any two directly associated objects output by the conduction probability model; wherein the conduction probability model is used to represent a corresponding relationship between each conduction relationship pair having the conduction edge features and the primary conduction probability, wherein the pre-trained conduction probability model comprises the trained network, further comprising training the conduction probability model by building conduction sample pairs based on the relationship graph by using a sliding time window, comprising selecting a first sample that is at risk during an initial period of the sliding window as an initial node;

determining, based on the relationship graph, a second sample associated with the initial node during a conduction period of the sliding time window as a termination node; and forming the conduction sample pair from the initial node and the termination node, labeling a pseudo-tag on each of the conduction sample pairs based on whether the termination node is at risk from the initial node in the conduction period, performing feature processing on a conduction edge of each tag-labeled conduction sample pair based on the relationship graph, to obtain conduction feature association pairs, wherein a conduction feature association pair of the conduction feature association pairs comprises a plurality of conduction sample pairs with pseudo-tags and conduction edge features corresponding to the conduction sample pairs, and training a pre-built conduction probability network based on the conduction feature association pairs, to obtain the trained conduction probability model;

determining, based on the primary conduction probability between any two directly associated objects in the relationship graph and the relationship graph, a multi-level conduction probability of the to-be-tested object, by using the relationship graph to determine risk propagation through indirection association paths;

determining a target risk probability of the to-be-tested object, based on the inherent risk probability and the multi-level conduction probability of the to-be-tested object; and transmitting instructions to display the obtained target risk probability on a display device.

2. The method according to claim 1, wherein the determining, based on the primary conduction probability between any two directly associated objects in the relationship graph and the relationship graph, the multi-level conduction probability of the to-be-tested object, comprises:

detecting, based on the relationship graph, whether there are a plurality of risk objects associated with the to-be-tested object, wherein the risk objects are objects of historical or current risk in the relationship graph;

in response to there being a plurality of risk objects associated with the to-be-tested object, calculating a parallel conduction probability of the plurality of risk objects based on the primary conduction probability between any two directly associated objects in the relationship graph, wherein the parallel conduction probability is used to represent a fusion of primary conduction probabilities between a risk object and a plurality of directly associated objects of the risk object; and determining, based on the parallel conduction probability, the relationship graph and a preset multi-level conduction rule, the multi-level conduction probability of the to-be-tested object.

3. The method according to claim 2, wherein the determining, based on the parallel conduction probability, the relationship graph and a preset multi-level conduction rule, the multi-level conduction probability of the to-be-tested object, comprises:

detecting, based on the parallel conduction probability, the relationship graph and the preset multi-level conduction rule, whether the to-be-tested object has a multi-level conduction risk; and calculating, in response to the to-be-tested object having the multi-level conduction risk, based on the parallel conduction probability, the multi-level conduction probability of the to-be-tested object.

4. The method according to claim 3, wherein the detecting, based on the parallel conduction probability, the relationship graph and the preset multi-level conduction rule, whether the to-be-tested object has a multi-level conduction risk, comprises:

detecting whether the parallel conduction probability meets a conduction stop condition; and detecting, in response to the parallel conduction probability not meeting the conduction stop condition, based on the parallel conduction probability, the relationship graph and the preset multi-level conduction rule, whether the to-be-tested object has the multi-level conduction risk.

5. The method according to claim 2, wherein, the determining, based on the primary conduction probability between any two directly associated objects in the relationship graph and the relationship graph, the multi-level conduction probability of the to-be-tested object, further comprises:

in response to the parallel conduction probability meeting a conduction stop condition, using the parallel conduction probability as the multi-level conduction probability of the to-be-tested object if the plurality of risk objects are directly associated with the to-be-tested object.

6. The method according to claim 1, the performing pseudo-tag labeling on each conduction sample pair based on the sliding window, comprises:

in response to the termination node being at risk in the conduction period, labeling the termination node with a pseudo-tag of conducted risk.

7. The method according to claim 1, wherein the training the pre-built conduction probability network based on the conduction feature association pairs, comprises:

correcting the conduction feature association pairs; and training the pre-built conduction probability network based on the corrected conduction feature association pairs.

8. The method according to claim 7, wherein the correcting the conduction feature association pairs, comprises:

comparing pseudo-tags of the plurality of conduction sample pairs in the conduction feature association pairs with pre-obtained probability predicted values and determining differences between the pseudo-tags and the probability predicted values; and performing outlier detection on the differences and removing conduction sample pairs having abnormal differences in the conduction feature association pairs to obtain the corrected conduction feature association pairs.

9. The method according to claim 8, wherein the probability predicted values are acquired by:

using a part of the plurality of conduction sample pairs in each conduction feature association pair as a training set, using conduction sample pairs other than the part of the plurality of conduction sample pairs in each conduction feature association pair as a prediction set, and training a binary classifier by using the training set and the prediction set to obtain the probability predicted values.

10. The method according to claim 8, wherein the correcting the conduction feature association pairs, further comprises:

using the probability predicted values as tags of the corrected conduction feature association pairs.

11. The method according to claim 1, wherein the determining the inherent risk probability of the to-be-tested object, further comprises:

determining the static features, the dynamic features and behavior features of the to-be-tested object;

splicing the static features, the dynamic features, and the behavior features to obtain a target feature of the to-be-tested object; and inputting the target feature into a pre-trained inherent risk prediction model to obtain the inherent risk probability output by the inherent risk prediction model, wherein the inherent risk prediction model is used to represent a corresponding relationship between the target features and the inherent risk probability.

12. The method according to claim 1, wherein the determining, based on the primary conduction probability between any two directly associated objects in the relationship graph and the relationship graph, a multi-level conduction probability of the to-be-tested object, by using the relationship graph to determine risk propagation through indirection association paths comprises: propagating primary conduction probabilities through the relationship graph to calculate risk conduction via indirect association paths, wherein the propagating comprises iteratively calculating conduction probabilities for objects beyond directly associated objects by applying the primary conduction probabilities across multiple levels of the relationship graph, using one or more of calculating a parallel conduction probability, applying a preset multi-level conduction condition and applying a conduction stop condition; and wherein the trained network comprises a trained neural network, or by training a model which is generated through automatic modeling process that integrates a plurality of different model types.

13. A computer-implemented data processing system for quantifying risk propagation in complex network data structures by addressing temporal risk conduction lag using a trained network, comprising:

at least one processor;

a display device;

a training module; and a memory communicatively connected to the at least one processor; wherein, the memory stores in non-transitory memory instructions executable by the at least one processor, and the instructions, when executed by the at least one processor, cause the at least one processor to perform operations comprising:

generating an inherent risk probability of a to-be-tested object, the generating comprising processing static features representing basic attributes of the to-be-tested object, and extracting dynamic features of the object from historical data using a time-series feature extraction process;

building and storing in non-transitory memory a relationship graph between the to-be-tested object and different associated objects, wherein the relationship graph comprises a plurality of nodes and association relationships among the nodes, and the building the relationship graph comprises extracting association relationships among the objects, creating entities in a graph database, creating node relationships in the graph database based on the association relationships, and constructing the relationship graph from the graph database;

determining a primary conduction probability between any two directly associated objects in the relationship graph, comprising determining, based on the relationship graph, all associated objects associated with the to-be-tested object, determining conduction relationship pairs based on all the associated objects associated with the to-be-tested object, each of the conduction relationship pairs having a direct association relationship, determining, based on the relationship graph conduction edge features of each conduction relationship pair, and inputting the conduction relationship pairs and the conduction edge features of each conduction relationship pair into a pre-trained conduction probability model, stored in non-transitory memory, to obtain the primary conduction probability between any two directly associated objects output by the conduction probability model wherein the pre-trained conduction probability model comprises the trained network;

determining, based on the primary conduction probability between any two directly associated objects in the relationship graph and the relationship graph, a multi-level conduction probability of the to-be-tested object by using the relationship graph to determine risk propagation through indirection association paths;

determining a target risk probability of the to-be-tested object, based on the inherent risk probability and the multi-level conduction probability of the to-be-tested object; and transmitting instructions to display the obtained target risk probability on the device;

wherein the memory stores in non-transitory memory the pre-trained conduction probability model, the conduction probability model represents a corresponding relationship between each conduction relationship pair having the conduction edge features and the primary conduction probability, said pre-trained conduction probability model is in communication with the training module, the training module is configured to train the conduction probability model by using conduction feature association pairs, the training module is configured to receive sample data, and is configured to process the sample data, comprising building conduction sample pairs based on the relationship graph, by using a sliding time window, comprising selecting a first sample that is at risk during an initial period of the sliding window as an initial node;

determining, based on the relationship graph, a second sample associated with the initial node during a conduction period of the sliding time window as a termination node; and forming the conduction sample pair from the initial node and the termination node, labeling a pseudo-tag on each of the conduction sample pairs based on whether the termination node is at risk from the initial node in the conduction period, and perform feature processing on a conduction edge of each tag-labeled conduction sample pair based on the relationship graph, to obtain conduction feature association pairs, wherein a conduction feature association pair of the conduction feature association pairs comprises a plurality of conduction sample pairs with pseudo-tags and conduction edge features corresponding to the conduction sample pairs.

14. The computer-implemented data processing system according to claim 13, wherein the determining, based on the primary conduction probability between any two directly associated objects in the relationship graph and the relationship graph, the multi-level conduction probability of the to-be-tested object, comprises:

detecting, based on the relationship graph, whether there are a plurality of risk objects associated with the to-be-tested object, wherein the risk objects are objects of historical or current risk in the relationship graph;

in response to there being a plurality of risk objects associated with the to-be-tested object, calculating a parallel conduction probability of the plurality of risk objects based on the primary conduction probability between any two directly associated objects in the relationship graph, wherein the parallel conduction probability is used to represent a fusion of primary conduction probabilities between a risk object and a plurality of directly associated objects of the risk object; and determining, based on the parallel conduction probability, the relationship graph and a preset multi-level conduction rule, the multi-level conduction probability of the to-be-tested object.

15. The computer-implemented data processing system according to claim 14, wherein the determining, based on the parallel conduction probability, the relationship graph and a preset multi-level conduction rule, the multi-level conduction probability of the to-be-tested object, comprises:

detecting, based on the parallel conduction probability, the relationship graph and the preset multi-level conduction rule, whether the to-be-tested object has a multi-level conduction risk; and calculating, in response to the to-be-tested object having the multi-level conduction risk, based on the parallel conduction probability, the multi-level conduction probability of the to-be-tested object.

16. The computer-implemented data processing system according to claim 15, wherein the detecting, based on the parallel conduction probability, the relationship graph and the preset multi-level conduction rule, whether the to-be-tested object has a multi-level conduction risk, comprises:

detecting whether the parallel conduction probability meets a conduction stop condition; and detecting, in response to the parallel conduction probability not meeting the conduction stop condition, based on the parallel conduction probability, the relationship graph and the preset multi-level conduction rule, whether the to-be-tested object has the multi-level conduction risk.

17. The computer-implemented data processing system according to claim 14, wherein, the determining, based on the primary conduction probability between any two directly associated objects in the relationship graph and the relationship graph, the multi-level conduction probability of the to-be-tested object, further comprises:

in response to the parallel conduction probability meeting a conduction stop condition, using the parallel conduction probability as the multi-level conduction probability of the to-be-tested object if the plurality of risk objects are directly associated with the to-be-tested object.

18. The computer-implemented data processing system according to claim 13, wherein, the performing pseudo-tag labeling on each conduction sample pair based on the sliding window, comprises:

in response to the termination node being at risk in the conduction period, labeling the termination node with a pseudo-tag of conducted risk.

19. The computer-implemented data processing system according to claim 13, wherein the training the pre-built conduction probability network based on the conduction feature association pairs, comprises:

correcting the conduction feature association pairs; and training the pre-built conduction probability network based on the corrected conduction feature association pairs;

wherein the correcting the conduction feature association pairs, comprises:

comparing pseudo-tags of the plurality of conduction sample pairs in the conduction feature association pairs with pre-obtained probability predicted values and determining differences between the pseudo-tags and the probability predicted values; and performing outlier detection on the differences and removing conduction sample pairs having abnormal differences in the conduction feature association pairs to obtain the corrected conduction feature association pairs;

wherein the probability predicted values are acquired by:

using a part of the plurality of conduction sample pairs in each conduction feature association pair as a training set, using conduction sample pairs other than the part of the plurality of conduction sample pairs in each conduction feature association pair as a prediction set, and training a binary classifier by using the training set and the prediction set to obtain the probability predicted values;

wherein the correcting the conduction feature association pairs, further comprises:

using the probability predicted values as tags of the corrected conduction feature association pairs.

20. A non-transitory computer readable storage medium storing computer instructions for quantifying risk propagation in complex network data structures by addressing temporal risk conduction lag using a trained network, wherein, the computer instructions are used to cause the computer to perform operations comprising:

generating an inherent risk probability of a to-be-tested object, comprising processing static features representing basic attributes of the to-be-tested object, and extracting dynamic features of the object from historical data using a time-series feature extraction process;

building a relationship graph between the to-be-tested object and different associated objects, wherein the relationship graph comprises a plurality of nodes and association relationships among the nodes, and the building the relationship graph comprises extracting association relationships among the objects, creating entities in a graph database, creating node relationships in the graph database based on the association relationships, and constructing the relationship graph from the graph database;

determining a primary conduction probability between any two directly associated objects in the relationship graph, comprising determining, based on the relationship graph, all associated objects associated with the to-be-tested object, determining conduction relationship pairs based on all the associated objects associated with the to-be-tested object, each of the conduction relationship pairs having a direct association relationship, determining, based on the relationship graph conduction edge features of each conduction relationship pair, and inputting the conduction relationship pairs and the conduction edge features of each conduction relationship pair into a pre-trained conduction probability model stored in memory to obtain the primary conduction probability between any two directly associated objects output by the conduction probability model; wherein the conduction probability model is used to represent a corresponding relationship between each conduction relationship pair having the conduction edge features and the primary conduction probability, wherein the pre-trained conduction probability model comprises the trained network, wherein the conduction probability model is trained by building conduction sample pairs based on the relationship graph by using a sliding time window, comprising selecting a first sample that is at risk during an initial period of the sliding window as an initial node;

determining, based on the relationship graph, a second sample associated with the initial node during a conduction period of the sliding time window as a termination node; and forming the conduction sample pair from the initial node and the termination node, labeling a pseudo-tag on each of the conduction sample pairs based on whether the termination node is at risk from the initial node in the conduction period, performing feature processing on a conduction edge of each tag-labeled conduction sample pair based on the relationship graph, to obtain conduction feature association pairs, wherein a conduction feature association pair of the conduction feature association pairs comprises a plurality of conduction sample pairs with pseudo-tags and conduction edge features corresponding to the conduction sample pairs, and training a pre-built conduction probability network based on the conduction feature association pairs, to obtain the trained conduction probability model;

determining, based on the primary conduction probability between any two directly associated objects in the relationship graph and the relationship graph, a multi-level conduction probability of the to-be-tested object, by using the relationship graph to determine risk propagation through indirection association paths;

determining a target risk probability of the to-be-tested object, based on the inherent risk probability and the multi-level conduction probability of the to-be-tested object; and transmitting instructions to display the obtained target risk probability on a display device.

* * * * *